United States Patent [19]
Takeuchi

[11] 3,849,826
[45] Nov. 26, 1974

[54] VEHICLE POLISHING APPARATUS

[75] Inventor: Shigeo Takeuchi, Nagoya, Japan

[73] Assignee: Takeuchi Tekko Kabushiki Kaisha, Nagoya-shi, Aichi-ken, Japan

[22] Filed: July 3, 1973

[21] Appl. No.: 376,207

[30] Foreign Application Priority Data
Sept. 12, 1972  Japan.............................. 47-105740

[52] U.S. Cl. .............................. 15/230.14, 15/97 R
[51] Int. Cl. ..... B24d 13/04, B24d 13/06, B60s 3/06
[58] Field of Search............ 15/89, 97 R, 210.5, 230, 15/230.1, 230.14, 230.16, 230.19; 29/121 R; 51/331, 332, 334–337, 358, 394, 395; 259/181; 416/73, 240

[56] References Cited
UNITED STATES PATENTS

| | | | |
|---|---|---|---|
| 735,632 | 8/1903 | Webster........................... | 15/230.14 |
| 1,799,808 | 4/1931 | Bartling........................... | 15/230.16 |
| 2,559,385 | 7/1951 | Bahr................................. | 15/230.1 |
| 2,574,037 | 11/1951 | Hendrickson.................... | 15/230.14 |
| 3,296,646 | 1/1967 | Bizovi........................ | 15/230.14 X |
| 3,774,259 | 11/1973 | Genaro ............................. | 15/97 R |

*Primary Examiner*—Daniel Blum
*Attorney, Agent, or Firm*—Waters, Roditi, Schwartz & Nissen

[57] ABSTRACT

A polishing apparatus comprising a rotary buffer which includes a cylindrical body and a multitude of corrugated fan-shaped elementary buffer elements formed of pliable sheet material and removably fixed at the base end to the peripheral surface of the cylindrical body. The buffer elements are readily yieldable in use to any irregularities of the vehicle surface including fender mirrors and antenna rods, thus involving no danger of damaging such vehicle parts. They are also advantageous in that they can be readily replaced when injured or worn out and thus substantially reduce the cost of maintenance and shut down time of the apparatus.

3 Claims, 3 Drawing Figures

PATENTED NOV 26 1974 3,849,826

VEHICLE POLISHING APPARATUS

BACKGROUND AND SUMMARY OF THE INVENTION

This invention relates to vehicle polishing apparatus workable on the surface of a vehicle, previously washed and dried, to give a good lustre thereto.

Vehicle polishing apparatus is known which includes a rotary buffer movable relative to the vehicle surface while rotating in sliding engagement therewith for an automatic wax coating or buffing operation. However, in the operation of previous forms of such apparatus, the rotary buffer has occasionally been caught by a fender mirror, an antenna rod or other vehicle part projecting from the vehicle surface and thus caused damage to such part.

In view of this, the present invention has for its object the provision of a new and improved vehicle polishing apparatus which is free from the difficulties as described above, including a rotary buffer comprised of a multitude of pliable elementary buffer elements particularly adapted to smoothly pass over any projection on the vehicle surface, and thus are capable of efficiently wax coating or buffing the vehicle surface without any danger of damaging projecting parts of the vehicle.

Another object of the present invention is to provide a vehicle polishing apparatus of the character described in which any of the elementary buffer elements can be readily replaced when damaged or worn out without necessitating lengthy shut down of the apparatus.

BRIEF DESCRIPTION OF THE DRAWINGS

The present invention will now be described in detail with reference to the accompanying drawings, which illustrate one preferred embodiment of the invention and in which.

DESCRIPTION OF THE PREFERRED EMBODIMENT

Figures 1, 2, 3:
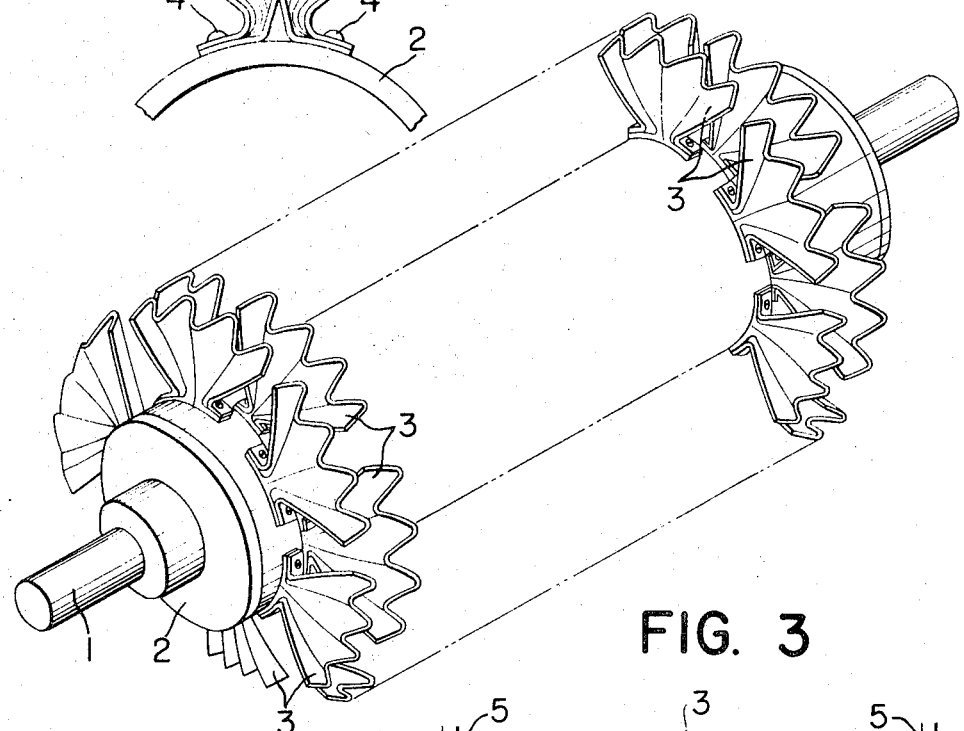
FIG. 1 a perspective view of a rotary buffer assembly of the invention.
FIG. 2 is a side elevational view of one of the elementary buffer elements of the assembly shown in FIG. 1.
FIG. 3 is a front elevational view of the vehicle polishing apparatus embodying the present invention, showing the apparatus in the state working on a vehicle.

Referring to the drawings, reference numeral 1 designates a driven shaft rotatably supported in a horizontal position by a pair of spaced rocker arms 5, which are rockably suspended by appropriate means from a portal or other form of frame through which a vehicle to be polished proceeds. Fixedly mounted on the driven shaft 1 is a cylindrically shaped body 2 carrying a multitude of fan-shaped elementary buffer elements 3, which are removably fixed at their base ends to the outer peripheral surface of the cylindrical body 2 as by screw means 4 in staggered relation to each other. The elementary buffer elements 3 are each formed of an appropriate pliable material, such as flannel sheet, and each is in a fixed corrugated state to form radial flutes. As clearly seen in FIG. 2, each of the elementary buffer elements 3, as fixed to the periphery of the cylindrical body 2' extends radially outwardly therefrom substantially in a plane normal to the axis of cylindrical body 2 and is readily deformable under external pressure and, when released, readily resumes its original shape and position.

Description will next be made of the operation of the apparatus embodying the present invention.

For a polishing operation, the shaft 1 is driven in rotation by appropriate drive means, not shown, and a vehicle just washed and dried is advanced through the apparatus, as shown in FIG. 3, for sliding engagement with the rotating buffer assembly. It is to be noted that, during the operation, the buffer elements 3 rotating in direct engagement with the vehicle surface can pass over the latter with particular smoothness in spite of any projection on the surface. In other words, the buffer elements 3 can smoothly proceed past any part of the vehicle projecting from its surface, yielding under the pressure of contact therewith, owing to their corrugated fan-shaped formation, which enables them not only to freely spread and contract in their respective planes but also to freely flex sidewise and back and forth in the direction of rotation. As will readily be appreciated, this eliminates any danger that any projecting vehicle parts will be damaged in the buffing operation and enables the apparatus to work uniformly on the vehicle body all over the surface thereof including the areas close to the projecting parts.

It will further be appreciated that, since in the apparatus of the invention the buffer elements 3 are fixed individually to the peripheral surface of the cylindrical body 2, the rotary buffer can be readily repaired in case any of the buffer elements is damaged or worn out simply by replacing them independently from the other buffer elements. This obviously reduces the cost of maintenance and shut down time of the apparatus to a substantial extent.

Moreover, in the apparatus of the present invention, the buffer elements 3 can be arranged in substantially spaced relation to each other for efficient buffing operation owing to their fan-like spreading feature, which ensures even and uniform buffing engagement of the rotary buffer with the vehicle surface despite such spaced arrangement of the buffer elements.

While one preferred embodiment of the invention has been shown and described, it is to be understood that many changes and modifications may be made therein without departing from the spirit and scope of the invention as defined in the appended claims.

What is claimed is:

1. A cylindrical rotary buffer for use in vehicle polishing apparatus, said buffer comprising a shaft, a cylindrical body fixedly mounted on said shaft, a multitude of radially fluted fan-shaped flexible elementary buffer elements, each buffer element having a base end and an outer end, and fastener means removably fastening said buffer elements at their base ends to the outer peripheral surface of said cylindrical body at spaced locations thereon with their outer ends spaced from each other, said buffer elements extending substantially in planes normal to the axis of said cylindrical body in staggered relation to each other and expanding radially outwardly from their base ends to their outer ends with their outer peripheral edges corrugated in wave-like form, whereby said buffer elements can be readily replaced individually when damaged or worn out.

2. A buffer as claimed in claim 1 wherein a plurality of said buffer elements are secured on said cylindrical body in circumferentially spaced relation in each plane normal to the axis of said cylindrical body, the buffer elements in adjacent planes being so staggered to extend across the space formed between adjacent buffer elements in the adjacent plane.

3. A buffer as claimed in claim 2 wherein said fastener means comprises screw means attaching each buffer element to said cylindrical body.

* * * * *